United States Patent [19]

Limburg et al.

[11] Patent Number: 4,956,440

[45] Date of Patent: Sep. 11, 1990

[54] ARYLAMINE CONTAINING POLYHYDROXYETHER RESINS

[75] Inventors: William W. Limburg, Penfield; Dale S. Renfer; John F. Yanus, both of Webster; Leon A. Teuscher, Webster, all of N.Y.

[73] Assignee: Xerox Corporation, Stamford, Conn.

[21] Appl. No.: 276,190

[22] Filed: Nov. 23, 1988

Related U.S. Application Data

[62] Division of Ser. No. 61,064, Jun. 10, 1987, Pat. No. 4,818,650.

[51] Int. Cl.$^5$ .............................................. C08G 59/28
[52] U.S. Cl. ........................................ 528/99; 528/96; 528/97; 528/98; 528/104
[58] Field of Search ................................... 528/96–99

[56] References Cited

U.S. PATENT DOCUMENTS

| | | | |
|---|---|---|---|
| 3,238,087 | 3/1966 | Norwalk et al. | 528/99 |
| 3,249,439 | 5/1966 | Bugel | 528/99 |
| 3,262,988 | 7/1966 | Joyce | 528/99 |
| 3,269,979 | 8/1966 | Snedeker | 528/99 |
| 3,277,051 | 10/1966 | Wynstra | 528/99 |
| 3,297,784 | 1/1967 | Snedeker et al. | 528/99 |
| 3,305,528 | 2/1967 | Wynstra et al. | 528/99 |
| 3,449,292 | 6/1969 | Snedeker | 528/97 |
| 3,477,990 | 11/1969 | Dante et al. | 528/104 |
| 3,725,341 | 4/1973 | Rogers et al. | 528/99 |
| 3,844,781 | 10/1974 | Tsuchiya et al. | 96/1.5 |
| 3,890,146 | 6/1975 | Nagashima et al. | 96/1.5 |
| 4,047,948 | 9/1977 | Horgan | 96/1.6 |
| 4,052,205 | 10/1977 | Stolka et al. | 96/1 |
| 4,265,990 | 5/1981 | Stolka et al. | 430/59 |
| 4,273,846 | 6/1981 | Pai et al. | 430/59 |
| 4,346,158 | 8/1982 | Pai et al. | 430/59 |
| 4,388,392 | 6/1983 | Kato et al. | 430/58 |
| 4,415,641 | 11/1983 | Goto et al. | 430/59 |
| 4,588,666 | 5/1986 | Stolka et al. | 430/59 |
| 4,588,667 | 5/1986 | Jones et al. | 430/73 |
| 4,786,668 | 11/1988 | Dewhirst | 523/445 |
| 4,786,669 | 11/1988 | Dewhirst | 528/99 |

FOREIGN PATENT DOCUMENTS 34425 5/1984 European Pat. Off. .

OTHER PUBLICATIONS

Photoconductivity and Hole Transport in Polymers of Aromatic Amine-Containing Methacrylates–M. Stolka, D. Pai, D. Renfer, J. Yanus–Journal of Polymer Science: Polymer Chemistry Edition, vol. 21, 969–983 (1983).

Primary Examiner—John Kight, III
Assistant Examiner—Frederick Krass

[57] ABSTRACT

Polymeric tertiary arylamine compounds of the phenoxy resin type which find utility especially in electrophotographic imaging.

1 Claim, No Drawings

ARYLAMINE CONTAINING POLYHYDROXYETHER RESINS

This is a division of application Ser. No. 061,064, filed June 10, 1987 now U.S. Pat. No. 4,818,650, issued Apr. 4, 1989.

BACKGROUND OF THE INVENTION

This invention relates in general to arylamine compounds and more specifically, to tertiary arylamine polymers having electrophotographic properties.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to to adjacent layers, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g. less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating molecule. The expression "electrically active" means that the material is capable of supporting the injection of either the hole or electron photogenerated charge carrier from the material in the charge generating layer and is capable of allowing the transport of these charge carriers through the electrically active layer in order to discharge a surface charge on the active layer. The multilayered type of photoreceptor may also comprise additional layers such as an anti-curl backing layer, an adhesive layer, and an overcoating layer. Although excellent toner images may be obtained with multilayered belt photoreceptors that are developed with dry developer powder (toner), it has been found that these same photoreceptors become unstable when employed with liquid development systems. These photoreceptors suffer from cracking, crazing, crystallization of active compounds, phase separation of activating compounds and extraction of activating compounds caused by contact with the organic carrier fluid, isoparaffinic hydrocarbons, e.g. Isopar, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-(4''-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenyl amino phenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$–$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure. The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. Although flexing is normally not encountered with rigid, cylindrical, multilayered photoreceptors which utilize charge transport layers containing activating small molecules dispersed or dissolved in a polymeric film forming binder, electrical degradation are similarly encountered during development with liquid developers. Sufficient degradation of these photoreceptors by liquid developers can occur in less than eight hours of use thereby rendering the photoreceptor unsuitable for even low quality xerographic imaging purposes.

Photoreceptors have been developed which comprise charge transfer complexes prepared with polymeric molecules. For example, charge transport complexes formed with polyvinyl carbazole are disclosed in U.S. Pat. Nos. 4,047,948, 4,346,158 and 4,388,392. Photoreceptors utilizing polyvinyl carbazole layers, as compared with current photoreceptor requirements, exhibit relatively poor xerographic performance in both electrical and mechanical properties. Polymeric arylamine molecules prepared from the condensation or di-secondary amine with a di-iodo aryl compound are disclosed in European Patent No. 34,425, published Aug. 26, 1981, issued May 16, 1984. Since these polymers are extremely brittle and form films which are very susceptible to physical damage, their use in a flexible belt configuration is precluded. Thus, in advanced imaging systems utilizing multilayered belt photoreceptors exposed to liquid developement systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design.

Photoreceptors having charge transport layers containing small molecule arylamine compounds dispersed or dissolved in various resins such as polycarbonates are known in the art. Similarly, photoreceptors utilizing polymeric arylamine containing molecules such as polyvinyl carbazole, polymethacrylates possessing pendant arylamines are also known. Further, condensation polymers of a di-secondary amine with a di-iodo aryl compound are described in the prior art.

PRIOR ART STATEMENT

Canadian Patent No. 11,171,431, corresponding to European Patent No. 34,425 to Xerox published Aug. 26, 1981, issued May 16, 1984—Condensation polymers of a di-secondary amine with a di-iodo aryl compound are described, for example, in working Examples IX and X.

Stolka et al, Photoconductivity and Hole Transport in Polymers of Aromatic Amine-Containing Methacrylates, Journal of Polymer Science: Polymer Chemistry Edition, Vol. 21,969 (1983)—Hole transport is described in high molecular weight arylamine-substituted polymethacrylates. Synthesis of the monomers, their polymerization, and the general properties of these polymers are also discussed.

U.S. Pat. No. 4,052,205 to Stolka et al, issued Oct. 4, 1977—A photoconductive imaging member is disclosed comprising various active polymers, such as poly-N-vinyl carbazole, in a transport layer, e.g. line 45, column 5 to line 27, column 6. Derivatives of the active polymers may be hydroxy substituted, e.g. column 5, lines 62–65.

U.S. Pat. No. 4,265,990 to Stolka et al, issued May 5, 1981—Transport layers are disclosed comprising small molecule arylamines and a polycarbonate resin binder.

U.S. Pat. No. 4,415,641 to Goto et al, issued Nov. 15, 1983—An electrophotographic light-sensitive element is disclosed comprising a carbazole derivative (see column 3, lines 1–14). $R_2$ can represent a hydroxy group.

U.S. Pat. No. 4,588,666 to Stolka et al, issued May 13, 1986—A hole transporting molecule is disclosed comprising alkoxy derivatives of tetra phenyl biphenyl diamine (see column 3, lines 33–66). $R_1$ and $R_2$ represent alkoxy groups which include methoxy. Resins such as polyvinyl carbazoles, polycarbonate resins, epoxy resins, polyvinyl butyrals, polyhydroxyether resins may be used as a binder for the hole transporting molecule.

U.S. Pat. No. 4,047,948 to A. M. Horgan, issued Sept. 13, 1977—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,346,158 to Pai et al, issued Aug. 24, 1982—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,388,392 to Kato et al, issued June 14, 1987—A photoreceptor is disclosed comprising layers which may contain polyvinyl carbazole. The use of an electron-donative polycyclic aromatic hydrocarbon incorporated in an electron-donative polymeric photoconductor in a charge transporting layer is also disclosed.

U.S. Pat. No. 4,273,846 to Pai et al, issued June 16, 1981—An imaging member is disclosed comprising a polycarbonate resin material and an arylamine (see the general formula, column 2, lines 21–34). Poly-N-vinyl carbazole may be employed in the generator layer.

U.S. Pat. No. 3,844,781 to Tsuchiya et al, issued Oct. 29, 1974—Various photoconductive materials are disclosed containing substituents such as hydroxyl, amino and alkoxy groups.

U.S. Pat. No. 3,890,146 to Nagashima et al, issued June 17, 1975—Various photoconductive materials are disclosed containing substituents such as hydroxyl, amino and alkoxy groups.

U.S. Pat. No. 4,588,667 to Jones, issued May 13, 1986—Various overcoated electrophotographic imaging members are disclosed including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

Thus, there is a continuing need for multilayered photoreceptors having improved resistance to cracking, crazing, delamination, softening, swelling, crystallization of active compounds, phase separation of active compounds and leaching of active compounds. In addition to the ink compatibility requirements the active compounds in charge transport layers must also have high resistivity for charge retention, high hole mobility for rapid discharge, and mechanical toughness for long life.

SUMMARY OF THE INVENTION

It is, therefore, an object of the present invention to provide an improved polymeric tertiary arylamine compound and a photoresponsive member containing the polymeric compound which overcome the above-noted disadvantages.

It is yet another object of the present invention to provide an improved electrophotographic member which exhibits greater resistance to cracking and crazing induced by liquid ink carrier fluid.

It is yet another object of the present invention to provide an improved electrophotographic member which exhibits greater resistance to cracking and crazing when mechanically cycled in a belt-type configuration around a narrow diameter roller.

It is a further object of the present invention to provide a photoconductive imaging member which exhibits improved resistance to component leaching during liquid development.

It is still another object of the present invention to provide a photoconductive imaging member which exhibits improved resistance to component crystallization.

It is a further object of the present invention to provide an electrophotographic imaging member which retains stable electrical properties during cycling.

It is yet another object of the present invention to provide an improved electrophotographic member which resists abrasion when exposed to blade cleaning devices.

It is a further object of the present invention to provide an improved photoconductive imaging member which exhibits resistance to softening and swelling when exposed to liquid ink carrier fluid.

The foregoing objects and others are accomplished in accordance with this invention by providing a polymeric arylamine compound represented by the formula:

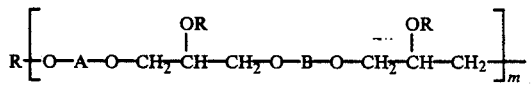

wherein:
R is selected from the group consisting of —H, —CH$_3$, and —C$_2$H$_5$;
m is between about 4 and about 1,000; and
A is selected from the group consisting of an arylamine group represented by the formula:

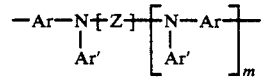

wherein:
m is 0 or 1,
Z is selected from the group consisting of:

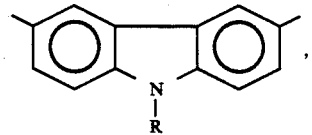

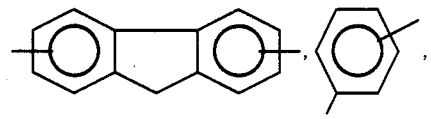

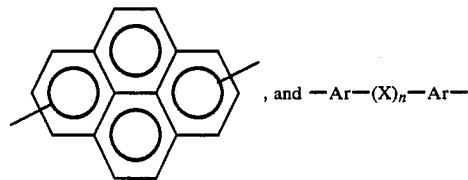

wherein:
n is 0 or 1,
Ar is selected from the group consisting of:

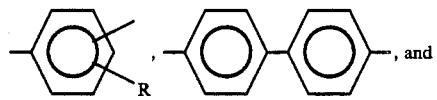

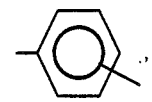

wherein:
R is selected from the group consisting of —CH$_3$, —C$_2$H$_5$, —C$_3$H$_7$, and —C$_4$H$_9$,
Ar' is selected from the group consisting of:

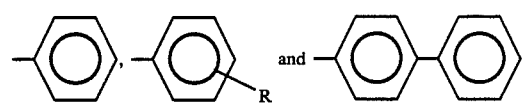

X is selected from the group consisting of: —CH$_2$—, —C(CH$_3$)$_2$—, —O—, —S—,

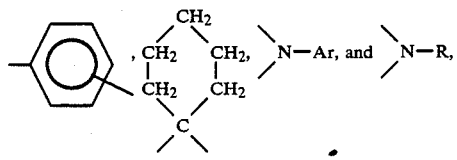

B is selected from the group consisting of:
the arylamine group as defined for A, and

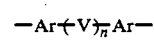

wherein Ar is as defined above, and V is selected from the group consisting of: —CH$_2$—, —C(CH$_3$)$_2$—, —O—, —S—,

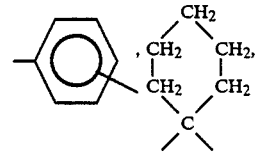

and at least A or B contains the arylamine group.

The polymeric arylamine compound of this invention is utilized in an electrophotographic imaging member comprising a substrate having an electrically conductive surface, a charge blocking layer, a charge generation layer, and a hole transport layer, at least the charge generation layer or charge transport layer containing the above described polymeric arylamine compound of this invention.

The electrophotographic imaging member of this invention may be employed in any suitable electrophotographic imaging process.

Generally, the polymeric arylamine compounds of this invention may be prepared by reacting a hydroxy compound selected from the group consisting of a hydroxy arylamine represented by the formula:

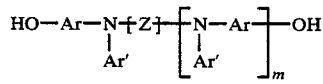

wherein:
m, Ar, Ar' and Z are as defined above, and a hydroxy diphenylene group represented by the formula:

wherein:
Ar and V are as defined above with a reactant selected from the group consisting of:
a diglycidyl arylamine compound represented by the formula:

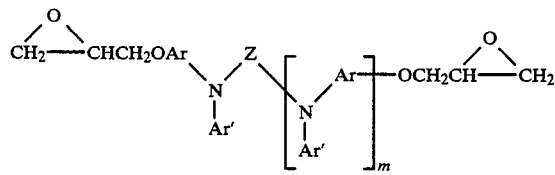

wherein:
m, Z, Ar, and Ar' are as defined above, and a diglycidyl diphenylene compound represented by the formula:

wherein:
Ar, V and n are as defined above, and wherein at least one of the reactants contains the arylamine group represented by the formula:

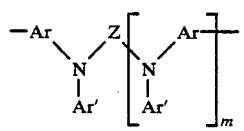

wherein: m, Z, Ar and Ar' are as defined above.

A catalyst may be used in the reaction. Typical catalysts include as ammonium carbonate, ammonium acetate, ammonium bicarbonate, potassium carbonate, triethanol amine, triphenyl phosphine, benzyl trimethylammonium hydroxide, and tetramethyl ammonium hydroxide.

A triphenyl phosphine is preferred because it greatly shortens the reaction time.

If desired, the hydroxyl end groups on the resulting polymeric arylamine may be converted to alkoxy end groups by treatment with a strong base such as KOH and an alkylating agent such as $CH_3I$, $C_2H_5I$, and the like. Replacement of the OH end groups with alkoxy groups is critical when the OH groups are located in the para position on the end phenylene group of the arylamine moiety of the polymer because such polymers cause unacceptably high levels of charge trapping in electrophotographic imaging members utilizing the polymer.

The foregoing reaction may be represented by the following general equation:

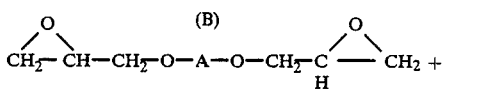

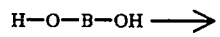

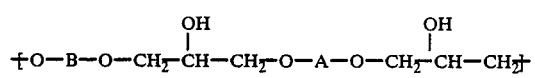

Compounds represented by the above hydroxy arylamine formula may be prepared by hydrolyzing an alkoxy arylamine. A typical process for preparing alkoxy arylamines is disclosed in Example I of U.S. Pat. No. 4,588,666 to Stolka et al, the entire disclosure of this patent being incorporated herein by reference. In accordance with the procedure of Example I in U.S. Pat. No. 4,588,666, N,N'-di(3-methoxyphenyl)-N,N'-diphenyl-[1,1-biphenyl]-4,4'-diamine was synthesized from m-iodoanisole to achieve a yield of 90 percent, m.p. 120°–125° C. N,N'-diphenyl-N,N'-bis(3-hydroxyphenyl)-[1,1'-biphenyl]-4,4'-diamine was prepared, for example, from the N,N'-di(3-methoxyphenyl)-N,N'-diphenyl-[1,1-biphenyl]-4,4'-diamine by placing into a two liter three-necked round bottom flask, equipped with a mechanical stirrer and an argon gas inlet, 137.5 gms N,N'-diphenyl-N,N'-bis(3-methoxy phenyl)-[1,1'-biphenyl]-4,4'-diamine (0.25 moles), 223.5 gms anhydrons sodium iodide (1.5 moles) and 500 millileters warm sulfolane (distilled). The contents of the flask were heated to 120° C. then cooled to 60° C. Five millileters of D.I. water was added dropwise, followed by 190.5 millileters of trimethyl(-chlorosilane (1.5 moles)). The contents were allowed to heat at 60°–75° C. for six hours. HPLC analysis was utilized to determine when the reaction was complete. The contents of the flask were poured into a 3 liter Erlenmeyer flask containing 1.5 liter of deionized water. The water layer was decanted and the dark oily residue taken up into 500 milliliters methanol. The methanol solution was extracted with two 400 milliliter portions of hexane to remove the hexamethyldisiloxane by-products. The methanol solution was roto-evaported to remove the solvents. The residue was taken up into 500 milliliters of acetone and then precipitated into 1.5 liters deionized water. The off-white solid was filtered and then washed with deionized water and dried in vacuo. The crude N,N'-diphenyl-N,N'-bis(3-hydroxyphenyl)-[1,1'-biphenyl]-4,4'-diamine was placed into a two liter round-bottom flask containing a magnetic stirrer and one liter toluene. Fifty gms. Florisil ® (Florisil is a registered trademark of Floridin Co.) was added to the flask and allowed to stir for two hours. The dark Florisil ® was filtered off, leaving a pale yelow toluene solution. The toluene was roto-evaporated to yield a pale yellow viscous oil. The oily product was dissolved in 400 milliliters acetone then diluted with 400 milliliters heptane and allowed to crystallize. The colorless crystals were filtered. Additional product was obtained by roto-evaporating the acetone from the filtrate. Yield was 85 percent, m.p. 113°–17° C. Typical compounds represented by the above formula for hydroxy arylamine compounds include:

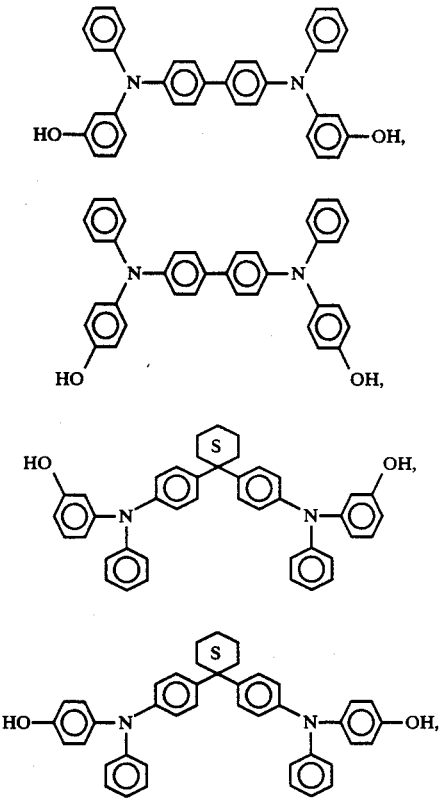

Compounds represented by the above formula include N,N'-diphenyl-N,N'-bis(3-hydroxyphenyl)-[1,1'-biphenyl]-4,4'-diamine; N,N-di(4-hydroxyphenyl)-m-toluidine; bis-(N-(3-hydroxyphenyl)-N-phenyl-4-aminophenyl)-methane; bis[(N-(4-hydroxyphenyl)-N-phenyl)-4-aminophenyl]-isopropylidene; N,N'-diphenyl-N,N'-bis(3-hydroxyphenyl)-[1,1':4',1''-terphenyl]-4,4''-diamine; 9-ethyl-3.6-bis[N-phenyl-N-3(3-hydroxyphenyl)-amino]-carbazole; 1,4-bis[N-phenyl-N-(3-hydroxyphenyl)]-phenylenediamine; and the like.

Typical compounds represented by the above formula for hydroxy diphenylene compounds include:

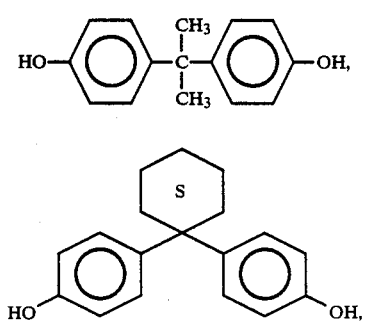

Compounds represented by the above formula for diglycidyl are di(4-hydroyphenyl) ether; di(3-hydroyphenyl) ether; di(4-hydroyphenyl) methane; di(3-hydroyphenyl) methane; di(3-hydroyphenyl) isopropylidene; di(4-hydroyphenyl) isopropylidene; di(4-hydroyphenyl) thioether; and 4,4''-dihydroxy-1,1':3',1''-terphenyl; and the like.

Compounds represented by the above formula for diglycidyl arylamine compounds can be prepared by the above formula with epibromohydrin or epichlorohydrin (Aldrich Chemical). A typical reaction is run using N-methyl pyrolidinone, 200 milliliters (mls) through which Argon is bubbled for about 10 minutes. Eleven (11) grams of powdered KOH was then added with stirring. This mixture was stirred for about 20 minutes. N,N'-diphenyl-N,N'-4-hydroxyphenyl-[1,1'-biphenyl]-4,4'-diamine (0.078 mole), 42.8 grams, was then added particlewise with stirring. After dissolution, the reaction mixture is cooled to about 10° C. Epibromohydrin is added dropwise with stirring. After one half of addition is complete, the ice bath was removed, and the addition was completed. The reaction was allowed to stir for 2 hours after the addition was complete. The reaction is quenched in water. The product isolated could be recrystallized with difficulty from ethyl alcohol. 30 grams were isolated, about 50 percent yield.

Typical compounds represented by the above formula for diglycidyl arylamine compounds include:

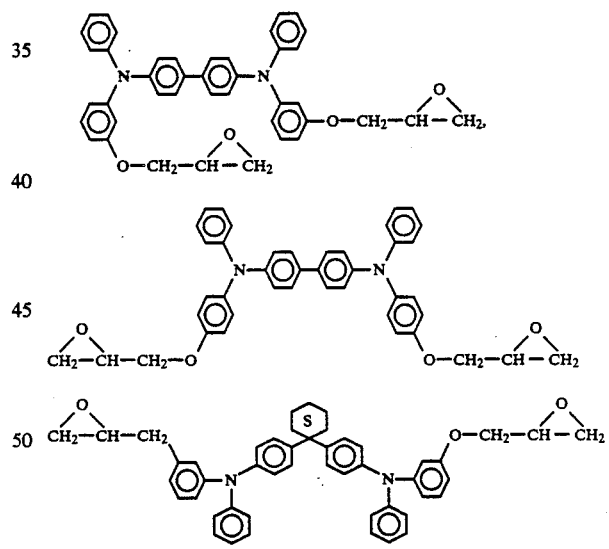

Compounds represented by the above formula include N,N'-diphenyl-N,N'-bis(3-(2,3-epoxypropoxy)-phenyl)-[1,1'-biphenyl]-4,4'-diamine; N,N-di(4-(2,3-epoxypropoxy)-phenyl)-aniline; 1,1-bis(4-(N-3-(2,3-epoxypropoxy)phenyl)-4-(N-phenyl)-aminophenyl)-cyclohexane; bis[N-(3-(2,3-epoxypropoxy)phenyl)-N-phenyl-4-aminophenyl]-methane; bis[N-(4-(2,3-epoxypropoxy)phenyl)-N-phenyl-4-aminophenyl]-isopropylidene; N,N'-diphenyl-N,N'-bis(3-(2,3-epoxypropoxy)-phenyl)-[1,1':4',1''-terphenyl]-4,4''-diamine; 9-ethyl-3,6-bis[N-phenyl-N-(3-(2,3-epoxypropoxy)phenyl)-amino]- carbazole; 1,4-bis[N-phenyl-N-(3-(2,3-epoxypropoxy)-phenyl)]-phenylenediamine; and the like.

Typical compounds represented by the above formula for diglycidyldiphenylene compounds include:

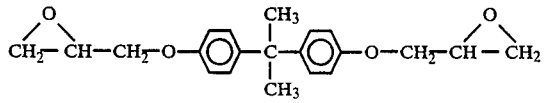

Compounds represented by the above formula include di(4-(2,3-epoxypropoxy)phenyl)-ether; di(3-(2,3-epoxypropoxy)phenyl)-ether; di(4-(2,3-epoxypropoxy)phenyl)-methane; di(3-(2,3-epoxypropoxy)phenyl)-isopropylidene; di(4-(2,3-epoxypropoxy)phenyl)-isopropylidene; di(4-(2,3-epoxypropoxy)phenyl)-thioether; 4,4''-di(2,3-epoxypropoxy)-1,1':3',1''-terphenyl; and the like.

The following is an illustrative reaction between a specific diglycidyl diphenylene compound and a specific dihydroxy arylamine compound followed by replacement of the hydroxyl group on the resulting polymer with a methoxy group:

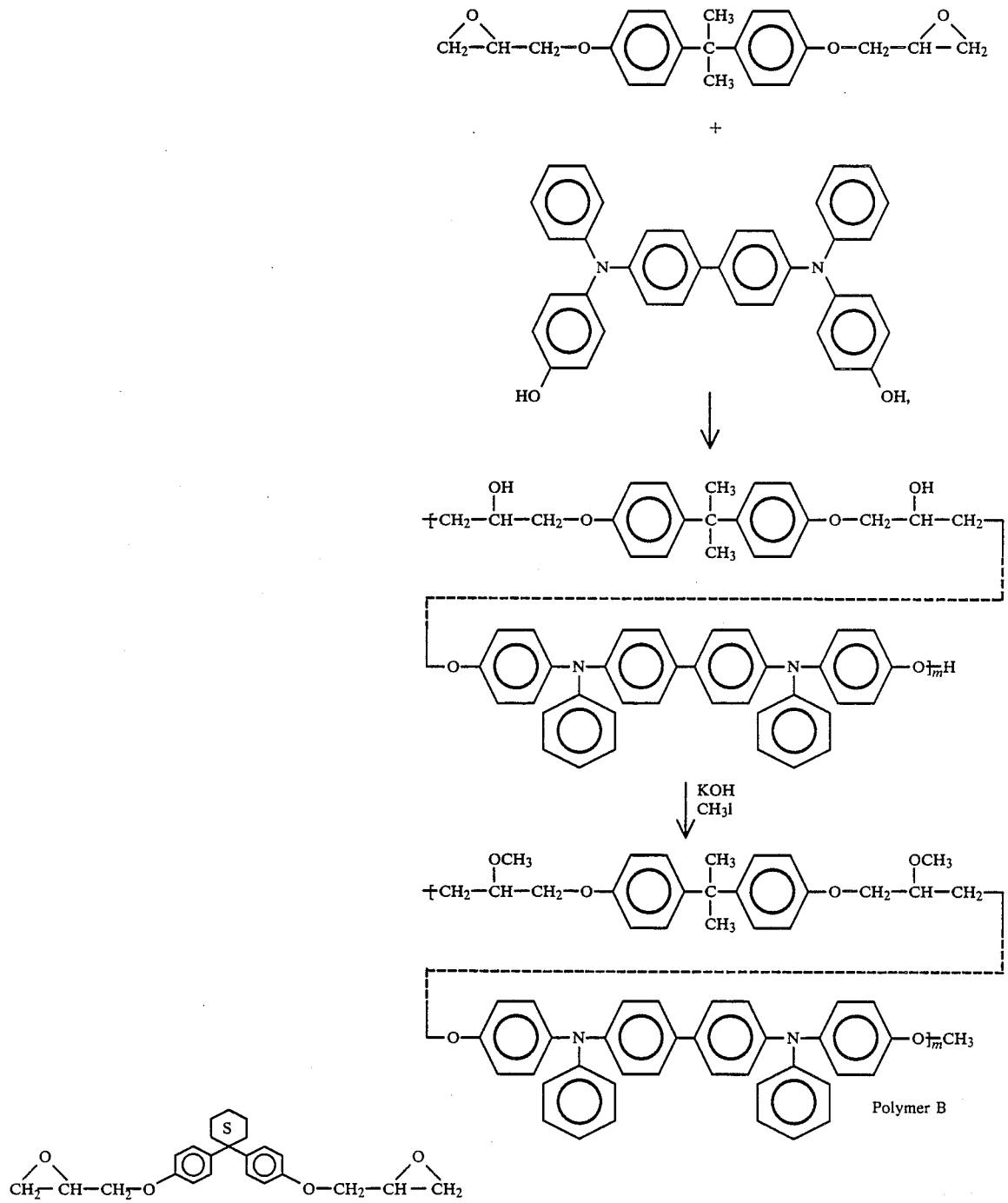

The value of m was between about 18 and about 19.

Preparation of polyhydroxy ether resin, phenoxy resin based on N,N'-di(4-hydroxyphenyl)-N,N'-diphenyl-[1,1'-biphenyl]-4,4'-diamine, and bis(4-(2,3-epoxypropoxy)phenyl)-isopropylidene:

To the reaction vessel are placed 5.2 grams (0.01 mole) of the dihydroxy arylamine compound and 3.4 grams (0.01 mole) of the diglycidyl diphenylene compound, 5 cc of p-dioxane and 0.52 gram ($10^{-2}$ mole/eq. weight of epoxide) of triphenyl phosphine $(C_6H_5)_3P$. The reaction mixture was heated to, and maintained at 102° C.±1 for 9 days. The very viscous mass, which solidifies to a glass upon cooling to room temperature, was dissolved in a minimum of THF, and isolated by slowly adding to 500 cc of MeOH in a Waring blender. Yield 85.6 percent.

The allylation of the phenoxy polymer is carried out in N-methyl pyrolidinone (Aldrich Chemical Company), 10 milliliters (mls) in which 4 grams of the polymer was dissolved. To this solution is added 1 gram of powdered KOH. To the now yellow solution was added $CH_3I$, 2 mls, diluted with 5 mls of N-methyl pyrolidinone. This was allowed to stir for about 2 hours. The reaction was quenched in 50 cc of MeOH. The white ppt was collected by filtration. The infrared spectrum indicated all OH are blacked.

The polymeric reaction product prior to methylation contained a rigid-rod like transporting arylamine moiety from the dihydroxy arylamine reactant in alternation with a flexibilizing unit derived from the diglycidyl-bis-phenol coreactant which imparted good mechanical properties to the polymer. From the infrared spectrum of polymer prior to methylation, it was determined that many of the end groups possessed the hydroxyl group of the dihydroxy arylamine starting material. When this polymer was cast as a 20 micrometer thick film on an amorphous selenium photogenerator layer and tested for electrical properties, the device exhibited such high levels of trapping that it could not be used in xerographic applications despite the fact that the polymer possessed good film forming and mechanical properties. However, when the polymeric reaction product prior to methylation was converted to the fully methylated polymer, B, (including both the phenolic end groups as well as the hydroxyl units in the backbone) by treatment with base (KOH) and the methylating agent, $CH_3I$, electrical evaluation of the methylated polymer under the same test conditions as the polymeric reaction product prior to methylation, revealed that the methylated polymer functioned well in a hole transporting capacity, i.e. it possessed high mobility and low residual. It appears that for achievement of good hole transporting capacity, methylation is required only when the hydroxyl group is located at the para position on the phenylene group of the arylamine moiety. Methylation is unnescessary when the hydroxyl group is located at the meta or ortho positions on the phenylene group of the arylamine moiety.

The following is an illustrative reaction between a specific diglycidyl arylamine compound and a specific dihydroxy arylamine compound:

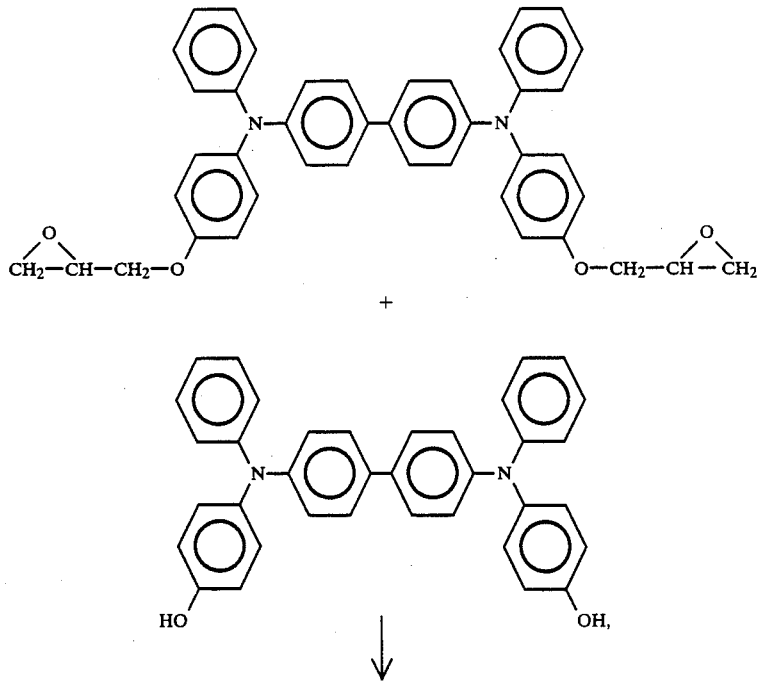

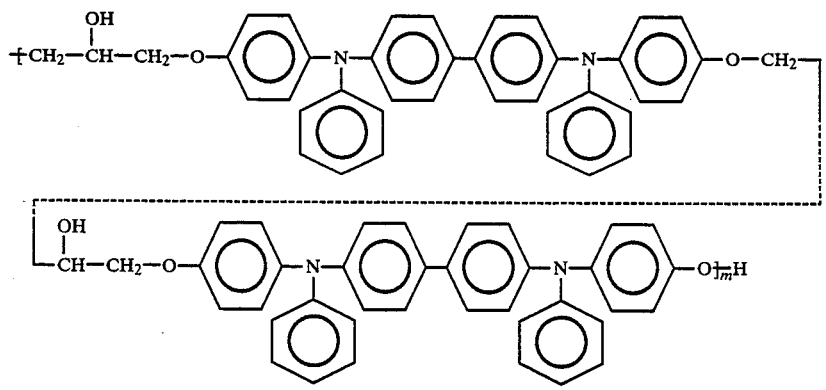

The value of m was between about 4 and about 5.

Preparation of polyhydroxyether resin phenoxy resin based on N,N'-diphenyl-N,N'-bis(4-hydroxyphenyl)-[1,1'-biphenyl]-4,4'-diamine, and N,N'-diphenyl-N,N'-bis(4-(2,3-epoxypropoxy)phenyl)-[1,1'-biphenyl]-4,4'-diamine:

The two reactants, 3.16 grams of the diepoxy arylamine compound, and 2.6 grams of the dihydroxy arylamine compound are placed in a reaction vessel with 2 cc of dioxane and 0.026 gram of triphenyl phosphene. The reaction was heated to and maintained at 105° C. for 3 days. Dioxane was added during this reaction period to maintain a viscosity suitable for stirring. The almost gel-like product was dissolved in N-Methyl pyrolidinone and dioxane. The polymer was precipitation was accomplished with MeOH. Yield obtained was 78 percent.

Unlike the polymer produced in the immediately preceding reaction, the number of phenolic end groups attached to the transporting moiety has been substantially reduced and the content of transporting moiety has been increased from 57.8 percent to 85.1 percent by weight. Although this polymer contains a hydroxyl group located at the para position on the phenylene group of the arylamine moiety, this polymer transports holes without a subsequent methyl blocking step. In addition, this polymer produced by a reaction between a diglycidyl arylamine compound and a dihydroxy arylamine compound is capable of forming interchain hydrogen bonds. This phenomena adds greatly to its mechanical strength and in addition, increases the oleophobicity relative to polymers in which hydrogen bonding is not possible. All synthesis steps leading to the polymer as well as the polymerization process itself are high yield.

Any suitable solvent may be employed to dissolve the reactants. Typical solvents include dioxane, tetrahydrofuran, and the like. Satisfactory yields are achieved with reaction temperatures between about 80° C. and about 110° C. The reaction temperature selected depends to some extent on the specific reactants utilized and specific catalyst used. The reaction temperature may be maintained by any suitable technique such as heating mantles, radiant heat lamps, oil baths, and the like.

The reaction time depends upon the reaction temperatures and reactants used. Thus, less reaction time is required when higher reaction temperatures are employed. Generally, increasing the reaction time increases the degree of polymerization. Satisfactory results have been achieved with reaction times between about 3 days to about 9 days at about 102° C. and about 105° C. For practical purposes, sufficient degree of polymerizatio is achieved by the time the reaction product is unable to be stirred at the reaction temperature.

The reaction may be conducted under any suitable pressure including atmospheric pressure.

One may readily determine whether sufficient reaction product has been formed by monitoring viscosity. Typical polymeric arylamine compounds of this invention include, for example

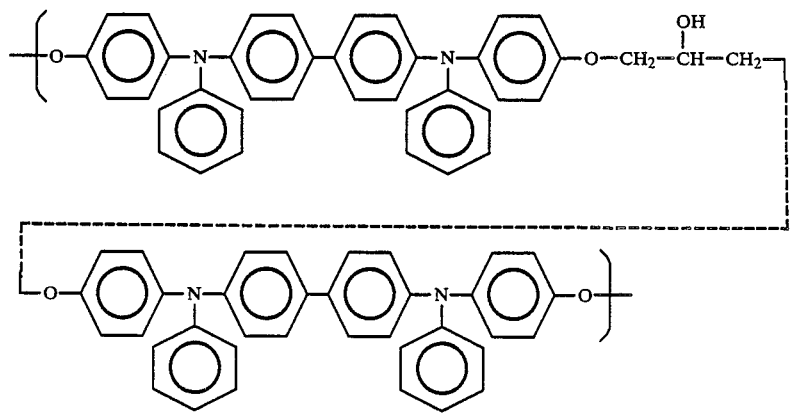

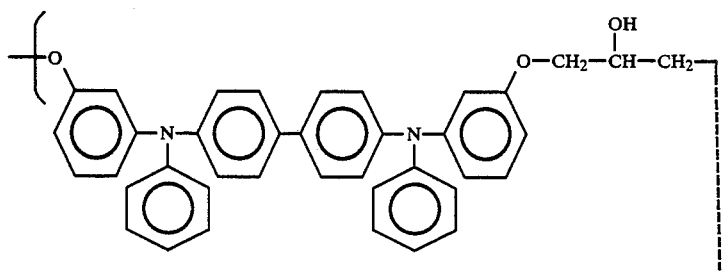

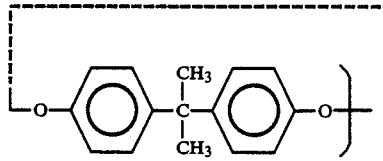

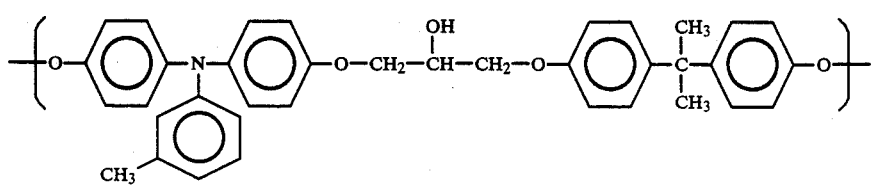

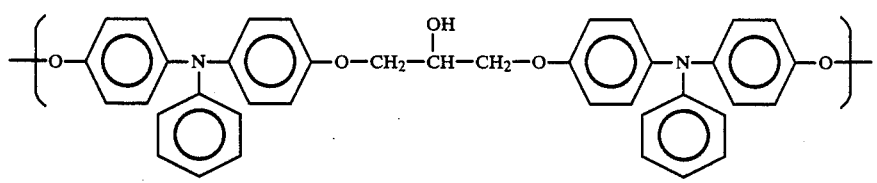

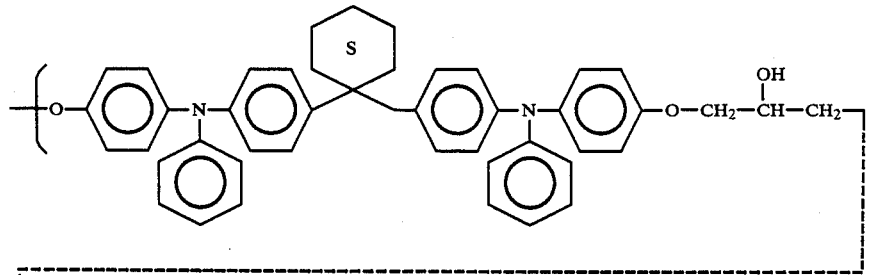

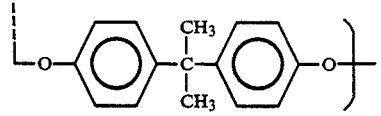

Preferred polymeric arylamines of this invention have a molecular weight from about 4,000 to about 40,000. The polyhydroxyether resins resulting from the reaction of N,N'-diphenyl-N,N'-bis(3-hydroxyphenyl)-[1,1'-biphenyl]-4,4'-diamine, and bis(4-(2,3-epoxypropoxy)phenyl)-isopropylidene is a preferred resin possessing no para hydroxy substituted arylamine end groups. This results in the best hole transport with no subsequent reaction required. It also retains the hydroxyl functionality in the backbone resulting in good physical properties. The material most preferred is of the following formula

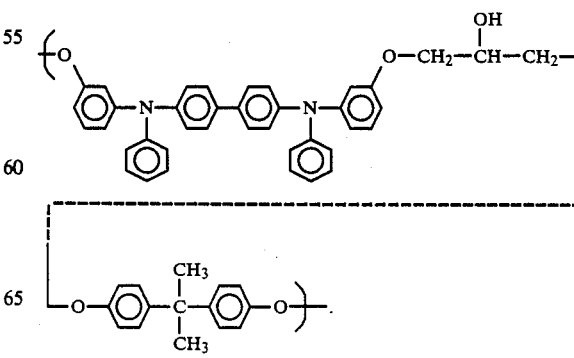

A photoconductive imaging member of this invention may be prepared by providing a substrate having an electrically conductive surface, applying a charge blocking layer on the electrically conductive surface, applying a charge generation layer on the blocking layer and applying a charge transport layer on the charge generation layer. If desired, the charge transport layer may be applied to the electrically conductive surface and the charge generation layer may thereafter be applied to the charge transport layer. The polymeric arylamine of this invention is present in at least the charge generation layer or the charge transport layer. When the photoconductive imaging member of this invention is employed in liquid development systems, the polymeric arylamine of this invention is preferably present in at least the outermost layer of the imaging member.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like. The electrically insulating or conductive substrate may be rigid or flexible and may have any number of different configurations such as, for example, a cylinder, sheet, a scroll, an endless flexible belt, and the like. Preferably, the substrate is in the form of an endless flexible belt and comprises a commercially available biaxially oriented polyester known as Mylar, available from E. I. du Pont de Nemours & Co. or Melinex available from ICI.

The thickness of the substrate layer depends on numerous factors, including economical considerations, and thus a layer for a flexible belt may be of substantial thickness, for example, over 200 micrometers, or of minimum thickness less than 50 micrometers, provided there are no adverse affects on the final photoconductive device. In one flexible belt embodiment, the thickness of this layer ranges from about 65 micrometers to about 150 micrometers, and preferably from about 75 micrometers to about 125 micrometers for optimum flexibility and minimum stretch when cycled around small diameter rollers, e.g. 12 millimeter diameter rollers. The surface of the substrate layer is preferably cleaned prior to coating to promote greater adhesion of the deposited coating. Cleaning may be effected by exposing the surface of the substrate layer to plasma discharge, ion bombardment and the like.

The conductive layer may vary in thickness over substantially wide ranges depending on the optical transparency and flexibility desired for the electrophotoconductive member. Accordingly, when a flexible photoresponsive imaging device is desired, the thickness of the conductive layer may be between about 20 angstrom units to about 750 angstrom units, and more preferably from about 50 Angstrom units to about 200 angstrom units for an optimum combination of electrical conductivity, flexibility and light transmission. The conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a conductive carbon black dispersed in a plastic binder as an opaque conductive layer.

After deposition of the metal layer, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be organic or inorganic and may be deposited by any suitable technique. For example, if the blocking layer is soluble in a solvent, it may be applied as a solution and the solvent can subsequently be removed by any conventional method such as by drying. Typical blocking layers include polyvinylbutyral, organosilanes, epoxy resins, polyesters, polyamides, polyurethanes, pyroxyline vinylidene chloride resin, silicone resins, fluorocarbon resins and the like containing an organo metallic salt. Other blocking layer materials include nitrogen containing siloxanes or nitrogen containing titanium compounds such as trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl) isostearoyl titanate, isopropyl tri(N-ethylamino-ethylamino) titanate, isopropyl trianthranil titanate, isopropyl tri(N,N-dimethylethylamino) titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The oxidized surface inherently forms on the outer surface of most metal ground plane layers when exposed to air after deposition. This combination enhances electrical stability at low RH. The hydrolyzed silane has the general formula:

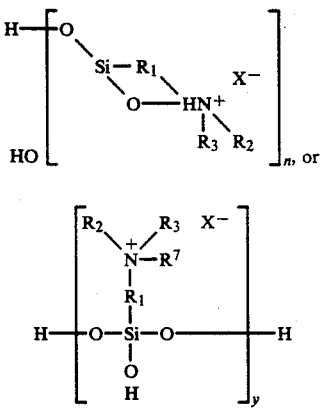

or mixtures thereof, wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, n is 1, 2, 3 or 4, and y is 1, 2, 3 or 4.

The imaging member is preferably prepared by depositing on the metal oxide layer of a metal conductive anode layer, a coating of an aqueous solution of the hydrolyzed aminosilane at a pH between about 4 and about 10, drying the reaction product layer to form a siloxane film and applying an adhesive layer of this invention, and thereafter applying electrically operative layers, such as a photogenerator layer and a hole transport layer, to the siloxane film.

The blocking layer should be continuous and have a thickness of less than about 0.5 micrometer because greater thicknesses may lead to undesirably high residual voltage. A blocking layer of between about 0.005 micrometer and about 0.3 micrometer (50 Angstroms-3000 Angstroms) is preferred because charge neutralization after the exposure step is facilitated and optimum electrical performance is achieved. A thickness of between about 0.03 micrometer and about 0.06 micrometer is preferred for metal oxide layers for optimum electrical behavior. Optimum results are achieved with a siloxane blocking layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Generally, a weight ratio of blocking layer material and solvent of between about 0.05:100 and about 0.5:100 is satisfactory for spray coating. This siloxane coating is described in U.S. Pat. No. 4,464,450 to L. A. Teuscher, the disclosure of this patent being incorporated herein in its entirety.

If desired, any suitable adhesive layer may be applied to the hole blocking layer. Typical adhesive layers include a polyester resin such as Vitel PE-100, Vitel PE-200, Vitel PE-200D, and Vitel PE-222, all available from Goodyear Tire and Rubber Co., polyvinyl butyral, duPont 49,000 polyester, and the like. When an adhesive layer is employed, it should be continuous and preferably, has a dry thickness between about 200 micrometers and about 900 micrometers and more preferably between about 400 micrometers and about 700 micrometers. Any suitable solvent or solvent mixtures may be employed to form a coating solution of the adhesive layer material. Typical solvents include tetrahydrofuran, toluene, methylene chloride, cyclohexanone, and the like, and mixtures thereof. Generally, to achieve a continuous adhesive layer thickness of about 900 angstroms or less by gravure coating techniques, the solids concentration are between about 2 percent and about 5 percent by weight based on the total weight of the coating mixture of resin and solvent. However, any other suitable and conventional technique may be utilized to mix and thereafter apply the adhesive layer coating mixture to the charge blocking layer. Typical application techniques include spraying, dip coating, roll coating, wire wound rod coating, and the like. Drying of the deposited coating may be effected by any suitable conventional technique such as oven drying, infra red radiation drying, air drying and the like.

Any suitable photogenerating layer may be applied to the blocking layer or intermediate layer if one is employed, which can then be overcoated with a contiguous hole transport layer as described. Examples of photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the tradename Monastral Red, Monastral violet and Monastral Red Y, Vat orange 1 and Vat orange 3 trade names for dibromo ant anthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multiphotogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layer comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Numerous inactive resin materials may be employed in the photogenerating binder layer including those described, for example, in U.S. Pat. No. 3,121,006, the entire disclosure of which is incorporated herein by reference. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, and the like. These polymers may be block, random or alternating copolymers.

Active carrier transporting resin may also be employed as the binder in the photogenerating layer. These resins are particularly useful where the concentration of carrier generating pigment particles is low and the thickness of the carrier generation layer is substantially thicker than about 0.7 micrometer. The active resin commonly used as a binder is polyvinylcarbazole whose function is to transport carriers which would otherwise be trapped in the layer.

The electrically active polymeric amines of this invention can be employed in the generation layer replacing the polyvinylcarbazole binder or any other active or inactive binder.

Part or all of the active resin materials to be employed in the generator layer may be replaced by the electrically active polymeric arylamines of this invention.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic materials such as chlorindium phthalocyanine, chloraluminum phthalocyanine, vanadyl phthalocyanine, and the like.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer comprises a polymeric aryl amine of this invention capable of supporting the injection of photo-generated holes from the charge generation layer and allowing the transport of these holes through the transport layer to selectively discharge the surface charge. When the photogenerating layer is sandwiched between the conductive layer and the active charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography, e.g. 4000 angstroms to 9000 angstroms. Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. When used with a transparent substrate, imagewise exposure may be accomplished through the substrate with all light passing through the substrate. In this case, the active transport material need not be transmitting in the wavelength region of use. The charge transport layer in conjunction with the generation layer in the instant invention is a material which is an insulator to the extent that an electrostatic charge placed on the transport layer is not conducted in the absence of illumination.

Part or all of the transport material comprising a hole transporting small molecule in an inactive binder to be employed in the transport layer may be replaced by the active materials of this invention described above comprising a polymeric arylamine film forming material. Any substituents in the polymeric arylamine compound should be free from electron withdrawing groups such as $NO_2$ groups, CN groups, and the like. The hole transporting small molecule-inactive resin binder composition may be entirely replaced with 100 percent of a polymeric arylamine compound of this invention.

Any suitable solvent may be employed to apply the transport layer material to the underlying layer. Typical solvents include methylene chloride, toluene, tetrahydrofuran, and the like. Methylene chloride solvent is a particularly desirable component of the charge transport layer coating mixture for adequate dissolving of all the components and for its low boiling point.

An especially preferred transport layer employed in one of the two electrically operative layers in the multilayer photoconductor of this invention comprises from about 50 percent to about 100 percent by weight of poly[3,3'-bis(hydroxyethyl)tetraphenylbenzidene]carbonate and from about 0 percent to about 50 percent by weight of bisphenol-A-polycarbonate.

Any suitable and conventional technique may be utilized to mix and thereafter apply the charge transport layer coating mixture to the underlying surface, e.g. charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the hole transport layer is between about 5 to about 100 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Other layers such as conventional ground strips comprising, for example, conductive particles dispersed in a film forming binder may be applied to one edge of the photoreceptor in contact with the conductive surface, blocking layer, adhesive layer or charge generating layer.

Optionally, an overcoat layer may also be utilized to improve resistance to abrasion. In some cases a back coating may be applied to the side opposite the photoreceptor to provide flatness and/or abrasion resistance. These overcoating and backcoating layers may comprise organic polymers or inorganic polymers that are electrically insulating or slightly semi-conductive.

The electrophotographic member of the present invention containing the electrically active polymeric arylamine in at least the generator or transport layer may be employed in any suitable and conventional electrophotographic imaging process which utilizes charging prior to imagewise exposure to activating electromagnetic radiation. Conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer of this invention is sandwiched between a transport layer and a conductive surface, a negative polarity charge is normally applied prior to imagewise exposure to activating electromagnetic radiation.

The electrophotographic member of the present invention exhibits greater resistance to cracking, crazing, crystallization of arylamine compounds, phase separation of arylamine compounds and leaching of arylamine compounds during cycling.

The invention will now be described in detail with respect to the specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Preparation of Polyhydroxy Ether Resin, Phenoxy Resin Based on N,N'-di(4-hydroxyphenyl)-N,N'-diphenyl-[1,1'-biphenyl]-4,4'-diamine, and bis(4-(2,3-epoxypropoxy)phenyl)-isopropylidene To the reaction vessel are placed 5.2 grams (0.01 mole) of the dihydroxy arylamine compound and 3.4 grams (0.01 mole) of the diglycidyl diphenylene compound, 5 cc of p-dioxane and 0.52 gram ($10^{-2}$ mole/eq. weight of epoxide) of triphenyl phosphine $(C_6H_5)_3P$. The reaction mixture was heated to, and maintained at 102° C. ±1 for 9 days. The very viscous mass, which solidifies to a glass upon cooling to room temperature, was dissolved in a minimum of THF, and isolated by slowly adding to 500 cc of MeOH in a Waring blender. Yield 85.6 percent. Mw 15,368. Mn 7,433.

An aluminum plate bearing a vacuum deposited 0.5 micrometer layer of amorphous selenium was coated with a tetrahydrofuran solution of the resulting polyhydroxyether resin (20 percent by weight solution) using a 50 micrometer draw bar. A film having a dry thickness of ~12 micrometers was obtained after drying under vacuum for 12 hours. Flat plate electrical scanning of this sample showed a $V_o$ (charge acceptance) of 900 V and a $V_R$ (residual voltage) of ~800 V. Exposure to Isopar L, an isoparaffinic hydrocarbon, for 1 week showed no small molecule leaching and no film cracking.

EXAMPLE II

The allylation of the phenoxy polymer is carried out in N-methyl pyrolidinone (Aldrich Chemical Company), 10 milliliters (mls) in which 4 grams of the polymer was dissolved. To this solution is added 1 gram of powdered KOH. To the now yellow solution was added $CH_3I$, 2 mls, diluted with 5 mls of N-methyl pyrolidinone. This was allowed to stir for about 2 hours. The reaction was quenched in 50 cc of MeOH. The white ppt was collected by filtration. The infrared spectrum indicated all OH are blacked. Mw 15,200. Mn 5,400.

An aluminum plate bearing a vacuum deposited 0.5 micrometer layer of amorphous selenium was coated with a tetrahydrofuran solution of the resulting alkylated polyethoxyether resin (20 percent by weight) solution using a 50 micrometer draw bar. A film having a dry thickness of ~12 micrometers was obtained after drying under vacuum for 12 hours. Flat plate electrical scanning of this sample showed a $V_o$ (charge acceptance) of 920 V and a $V_R$ (residual voltage) of ~0 V. Exposure to Isopar L, an isoparaffinic hydrocarbon, for 1 week showed no small molecule leaching and no film cracking.

EXAMPLE III

Preparation of Polyhydroxyether Resin, Phenoxy Resin Based on N,N'-diphenyl-N,N'-bis(3-hydroxyphenyl)-[1,1'-biphenyl]-4,4'-diamine, and bix(4-(2,3-epoxypropoxy)phenyl)-isopropylidene In a three-necked 250 round bottom flask (flamed out) equipped with an Argon blanket, mechanical stirrer, thermostated oil bath is placed the diepoxy phenylene compound DER 332, and the dihydroxy arylamine compound. The oil bath is raised to 110° C. To the reaction mixture is added 5 milliliters (mls) of dioxane and 0.1 gram triphenyl phosphine, $(C_6H_5)_3P$. The reaction mixture is a yellow color. The reaction is continued for 48 hours. During this period, dioxane is added, in 1 milliliter portions, as needed to maintain stirring. The reaction is worked up by adding 50 mls of THF to the cooling reaction flask. The solution was added to about 700 mls of MeOH in a Waring blender. An off-white solid was isolated. Mw 21,700, Mn 6,733.

An aluminum plate bearing a vacuum deposited 0.5 micrometer layer of amorphous selenium was coated with a tetrahydrofuran solution of the resulting polyhydroxyether resin (20 percent by weight solution) using a 50 micrometer draw bar. A film having a dry thickness of ~12 micrometers was obtained after drying under vacuum for 12 hours. Flat plate electrical scanning of this sample showed a $V_o$ (charge acceptance) of 990 V and a $V_R$ (residual voltage) of ~0 V. Exposure to Isopar L, an isoparaffinic hydrocarbon, for 1 week showed no small molecule leaching and no film cracking.

EXAMPLE IV

Preparation of Polyhydroxyether Resin Phenoxy Resin Based on N,N'-diphenyl-N,N'-bis(4-hydroxyphenyl)-[1,1'-biphenyl]-4,4'-diamine, and N,N'-diphenyl-N,N'-bis(4-(2,3-epoxypropoxy)phenyl)-[1,1'-biphenyl]-4,4'-diamine The two reactants, 3.16 grams of the diepoxy arylamine compound, and 2.6 grams of the dihydroxy arylamine compound are placed in a reaction vessel with 2 cc of dioxane and 0.026 gram of triphenyl phosphene. The reaction was heated to and maintained at 105° C. for 3 days. Dioxane was added during this reaction period to maintain a viscosity suitable for stirring. The almost gel-like product was dissolved in N-Methyl pyrolidinone and dioxane. The polymer was precipitation was accomplished with MeOH. Yield obtained was 78 percent. Mw 5,700. Mn 3,230.

An aluminum plate bearing a vacuum deposited 0.5 micrometer layer of amorphous selenium was coated with a tetrahydrofuran solution of the resulting polyhydroxyether resin (50/50 percent by weight) using a 50 micrometer draw bar. A film having a dry thickness of ~12 micrometers was obtained after drying under vacuum for 12 hours. Flat plate electrical scanning of this sample showed a $V_o$ (charge acceptance) of 980 V and a $V_R$ (residual voltage) of ~10 V. Exposure to Isopar L, an isoparaffinic hydrocarbon, for 1 week showed no small molecule leaching and no film cracking.

We claim:

1. An arylamine polymer represented by the formula:

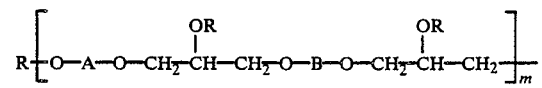

wherein:
R is selected from the group consisting of —H, —CH₃, and —C₂H₅;
m is between about 4 and about 1,000; and
A is an arylamine group represented by the formula:

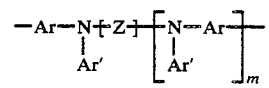

wherein:
m is 0 or 1,
Z is selected from the group consisting of:

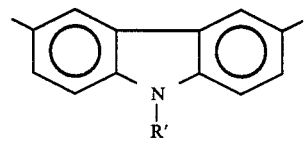

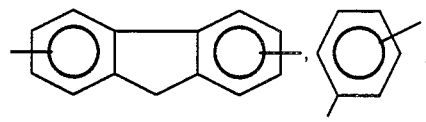

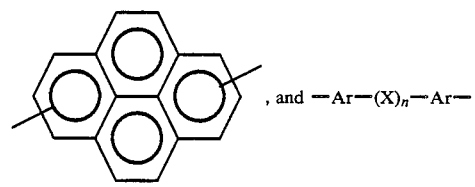

wherein:
n is 0 or 1,
Ar is selected from the group consisting of:

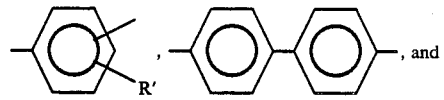

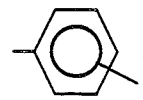

wherein:
R¹ is selected from the group consisting of —CH₃, —C₂H₅, —C₃H₇ and —C₄H₉,
Ar' is selected from the group consisting of:

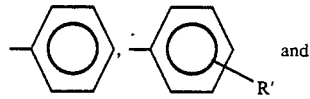

-continued
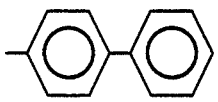
X is selected from the group consisting of: —CH$_2$—, —C(CH$_3$)$_2$—, —O—, —S—,
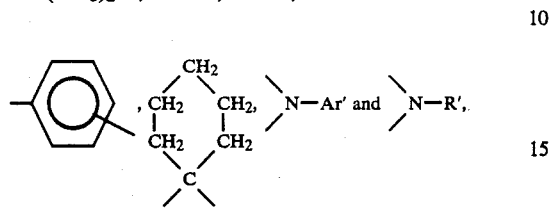
and
B is selected from the group consisting of:
the arylamine group as defined for A, and
—Ar(V)$_{\overline{n}}$Ar—
wherein Ar is as defined above, and V is selected from the group consisting of: —CH$_2$—, —C(CH$_3$)$_2$—, —O—, —S—,
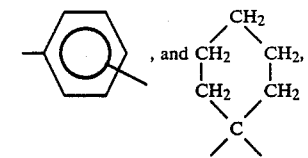
and n is 0 or 1.
* * * * *